Aug. 21, 1951   V. E. PRATT ET AL   2,565,088
DOCUMENT CAMERA
Filed Dec. 28, 1946   9 Sheets-Sheet 3

INVENTORS
VERNEUR E. PRATT
GEORGE F. GRAY
BY
Van Deventer & Grier
ATTORNEYS

Aug. 21, 1951
V. E. PRATT ET AL
2,565,088
DOCUMENT CAMERA
Filed Dec. 28, 1946
9 Sheets-Sheet 4
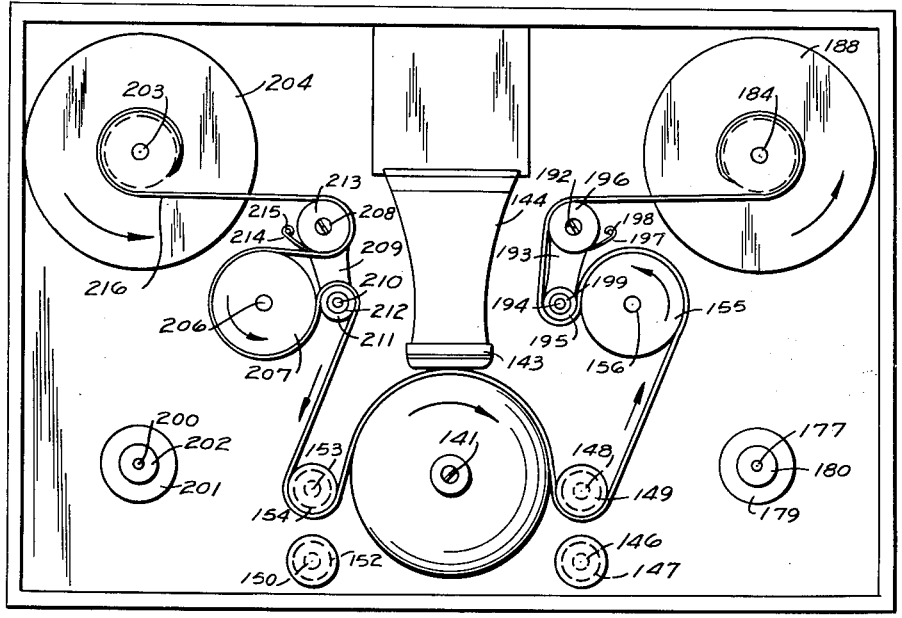
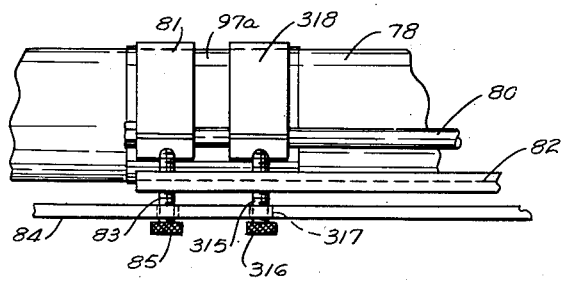
INVENTORS
VERNEUR E. PRATT
GEORGE F. GRAY
BY
Van Deventer + Grier
ATTORNEYS

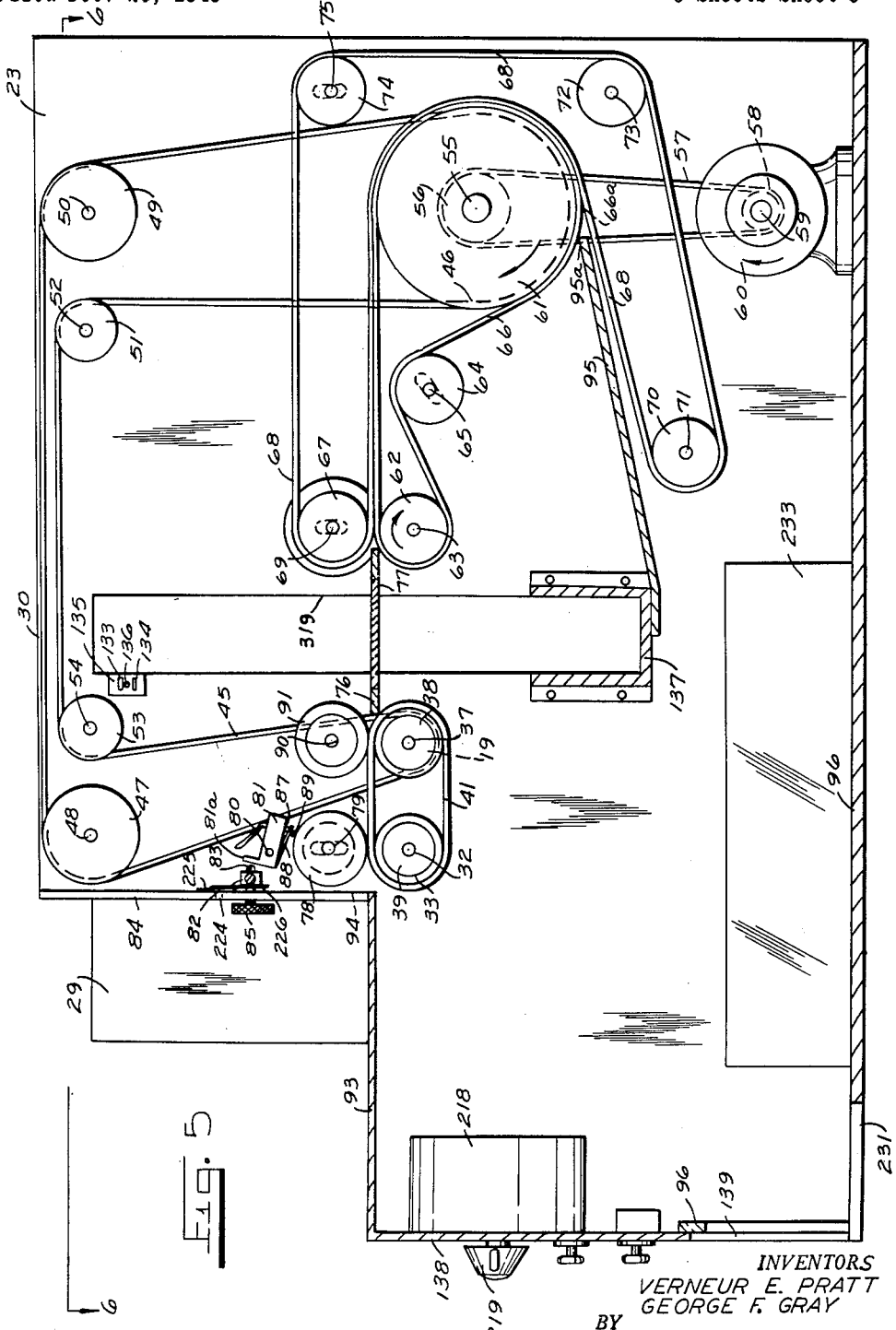

Aug. 21, 1951 V. E. PRATT ET AL 2,565,088
DOCUMENT CAMERA
Filed Dec. 28, 1946 9 Sheets-Sheet 6
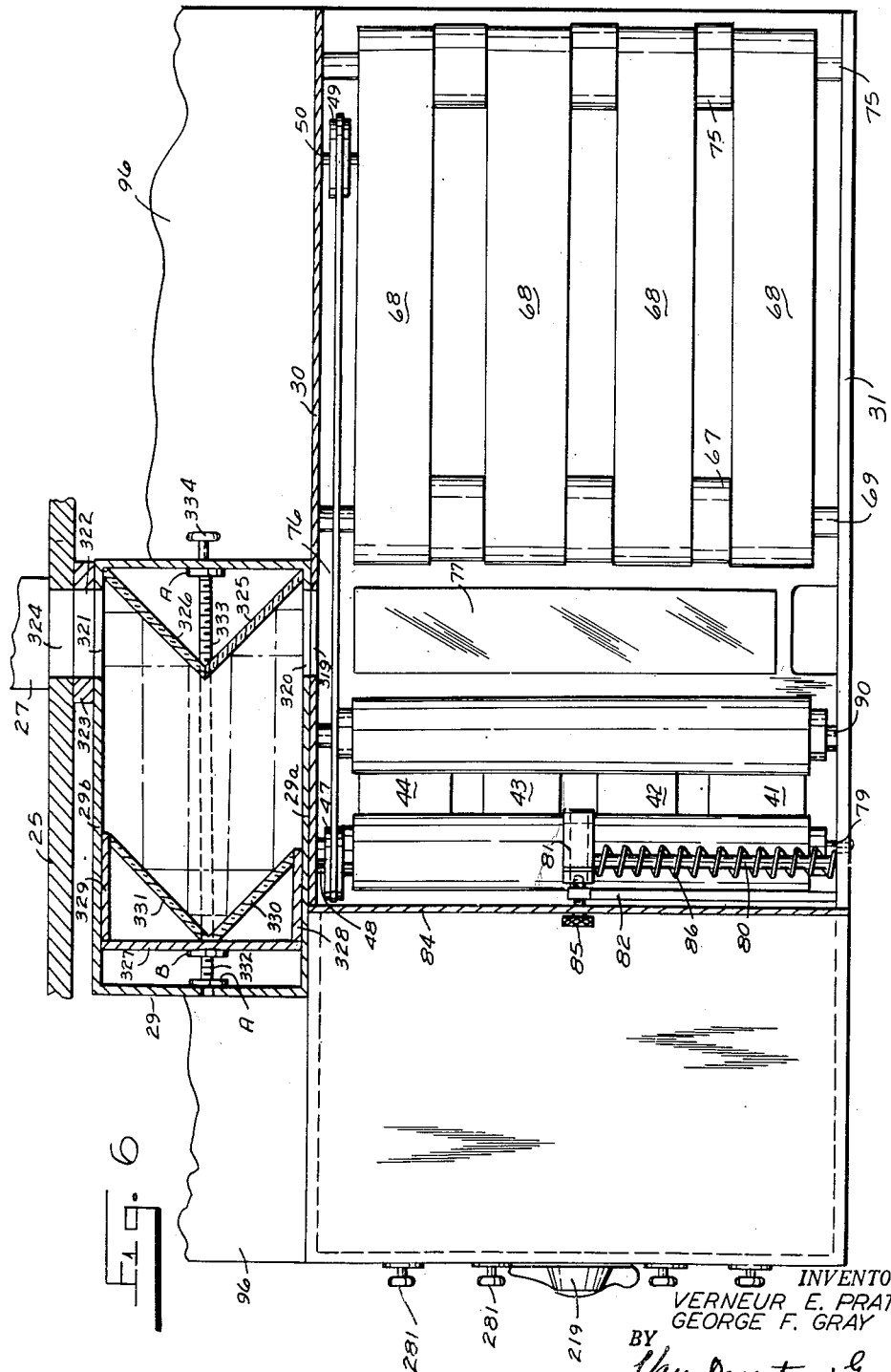
INVENTORS
VERNEUR E. PRATT
GEORGE F. GRAY
BY
Van Deventer & Grier
ATTORNEYS Aug. 21, 1951  V. E. PRATT ET AL  2,565,088
DOCUMENT CAMERA
Filed Dec. 28, 1946  9 Sheets-Sheet 7
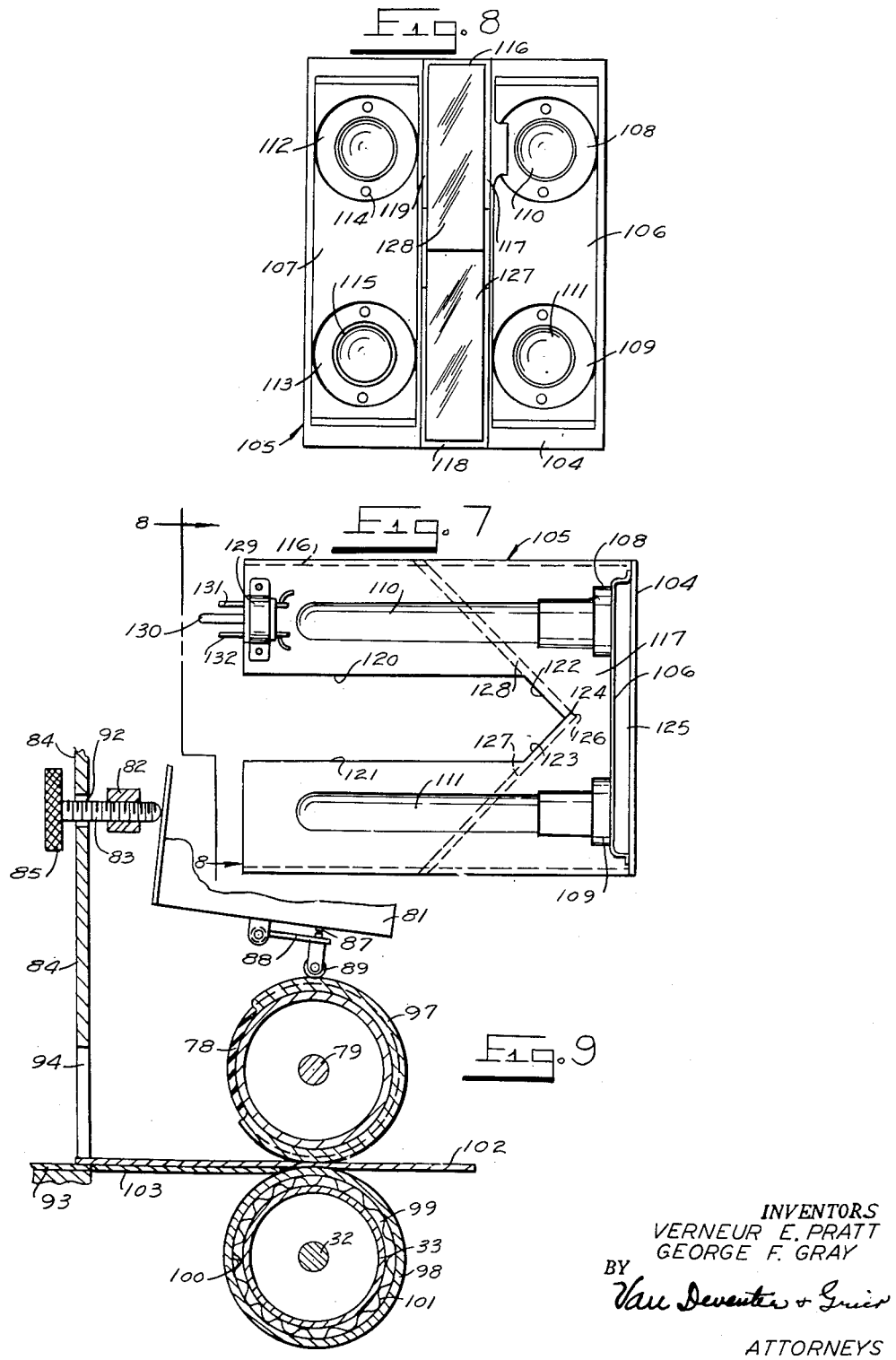
INVENTORS
VERNEUR E. PRATT
GEORGE F. GRAY
BY
Van Deventer & Grier
ATTORNEYS

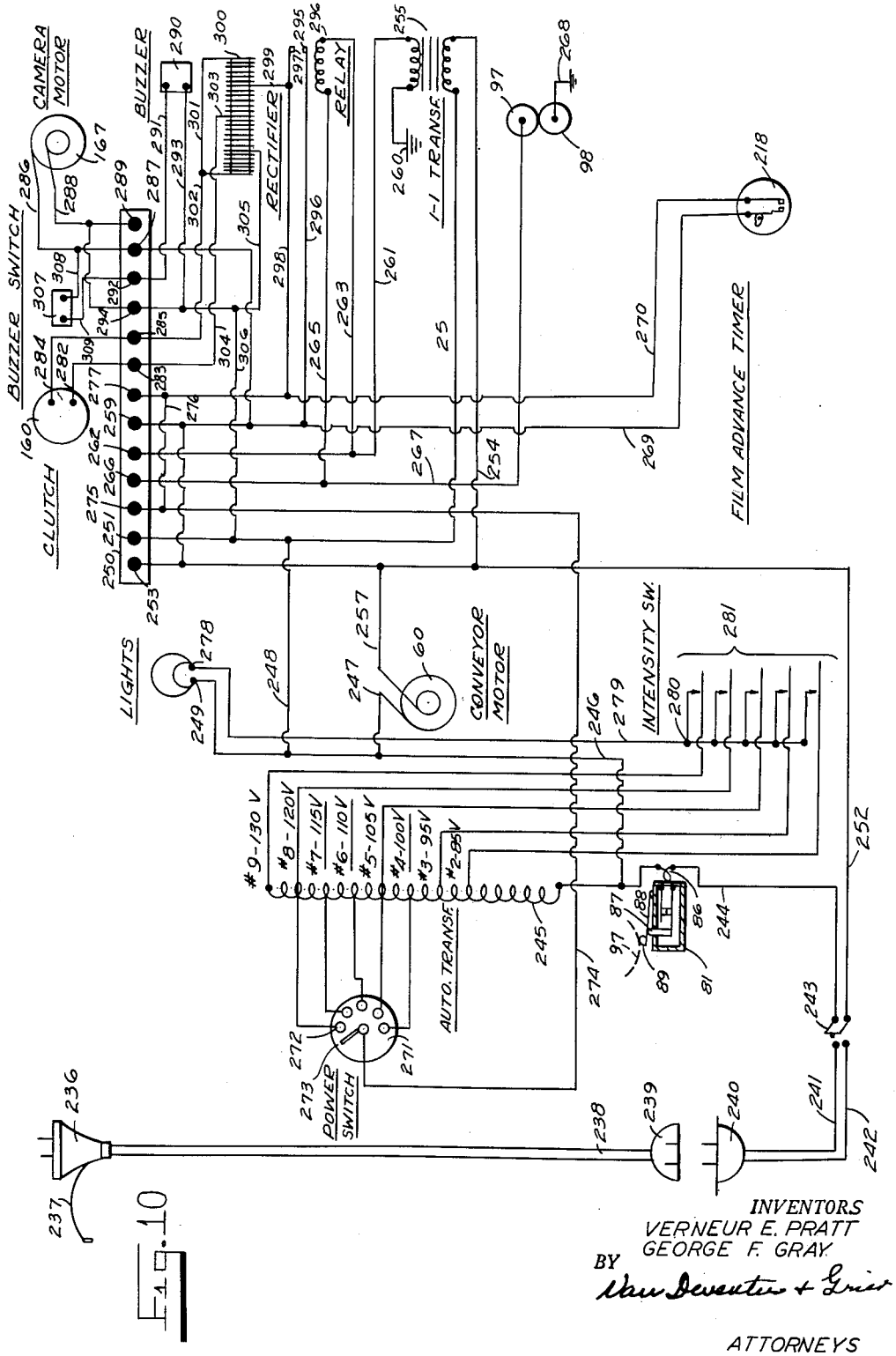

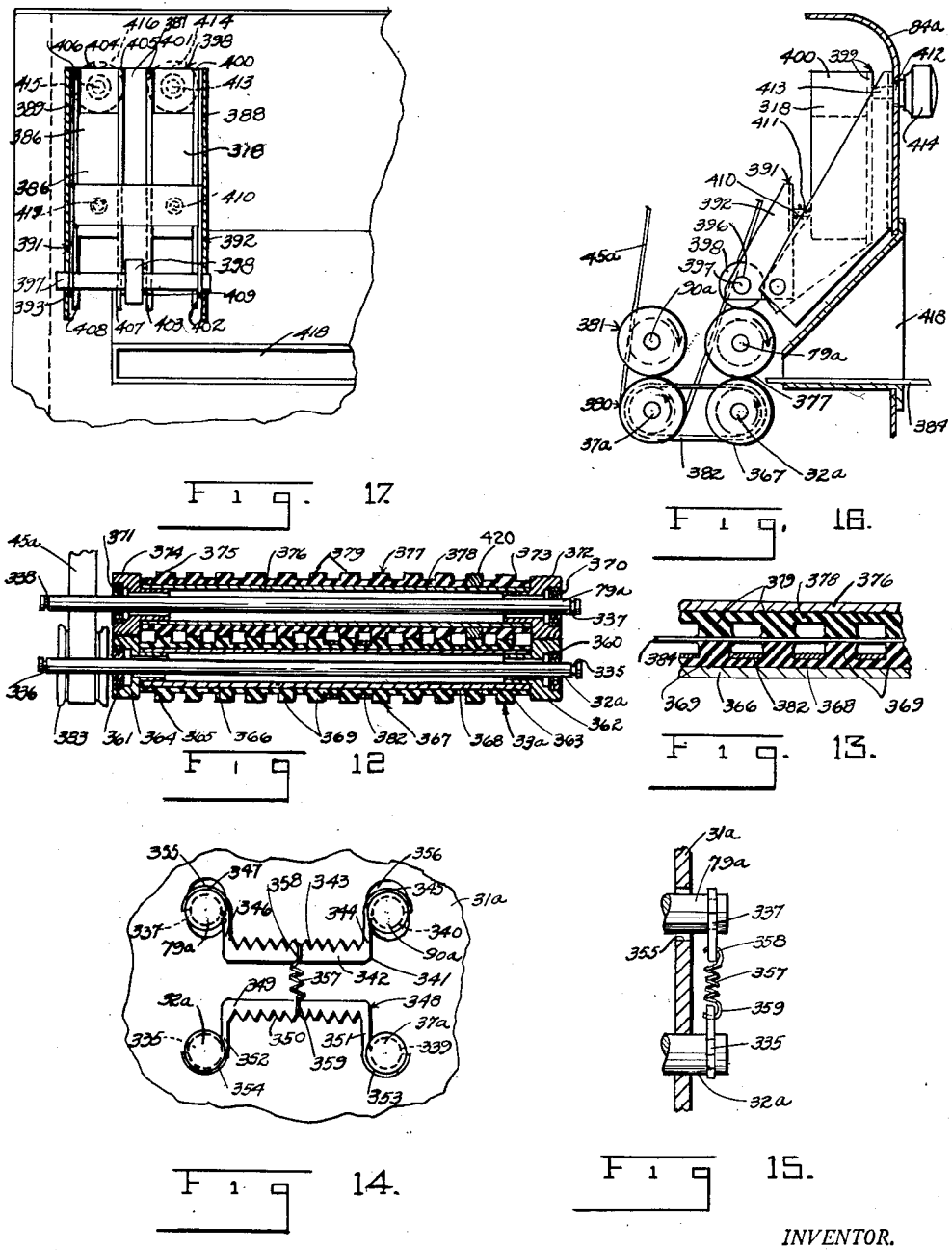

Patented Aug. 21, 1951

2,565,088

UNITED STATES PATENT OFFICE 2,565,088

DOCUMENT CAMERA

Verneur E. Pratt and George F. Gray, Norwalk, Conn.

Application December 28, 1946, Serial No. 719,018

5 Claims. (Cl. 88—24)

This invention relates to improvements in document cameras and is directed more particularly to a camera of the "flow" type which includes a feed table for conveying the documents to be photographed through the field of the lens of the camera.

Another object of the invention is the provision in a camera of the "flow" type of a mirror and illuminating unit straddling the feed-way for the documents and bodily removable from the camera, said unit including a plug which normally engages a socket in the camera, said plug and said socket being automatically separated as the mirror and illuminating unit is removed therefrom.

A further object of the invention is the provision in a "flow" camera of a feed table for the documents, said feed table including rollers for engaging and moving the documents therethrough and said feed rollers including metallic rings in cooperative relationship, at least one of which is spring loaded toward the other whereby said rings may be included in control circuits of the machine to effect control of such circuits when said rings are separated by a document.

Yet another object of the invention is the provision in a "flow" camera of a pair of feed rollers, at least one of which is movable toward and away from the other, and the provision of switching means cooperating with said movable roller and adapted to cause said camera to cease operating when more than one document is inserted between said rollers.

Other objects and advantages of the invention will be apparent to those skilled in the art upon a study of the following specification and the accompanying drawings.

Referring to the drawings:

Figure 4 is a plan view of the camera, showing the arrangement of the film reels, the various rollers, the free drum and the film driving drum;

Figure 5 is an elevation partly in section as seen along the lines 5—5 of Figure 2;

Figure 6 is a plan view taken along the lines 6—6 of Figure 5;

Figure 7 is an elevation of a mirror and lamp unit;

Figure 8 is a view of the mirror and lamp unit of Figure 7 as seen along the lines 8—8;

Figure 9 is an enlarged section showing the feed rollers and showing the action of our novel contact rings when actuated by a drum;

Figure 10 is a diagram of the circuits employed in our new and novel camera;

Figure 11 is a diagrammatic representation of an alternate arrangement for controlling the advancing of the film in the camera;

Figure 12 is a sectional view showing a modification of the document feed rollers;

Figure 13 is an exaggerated fragmentary view, showing how the feed rollers of Fig. 12 grip the documents;

Figure 14 is an end view of the shafts of the document feed rollers, showing our novel arrangement for varying the spring tension exerted on the feed rollers;

Figure 15 is an elevation of the ends of the feed roller shafts, showing further details of the spring arrangement shown in Figure 14;

Figure 16 is an elevation, partly in section, showing a modification of the arrangement of the micro switches shown in Figure 11; and Figure 17 is an elevation as seen along the lines 17—17 of Figure 16.

Figure 1:
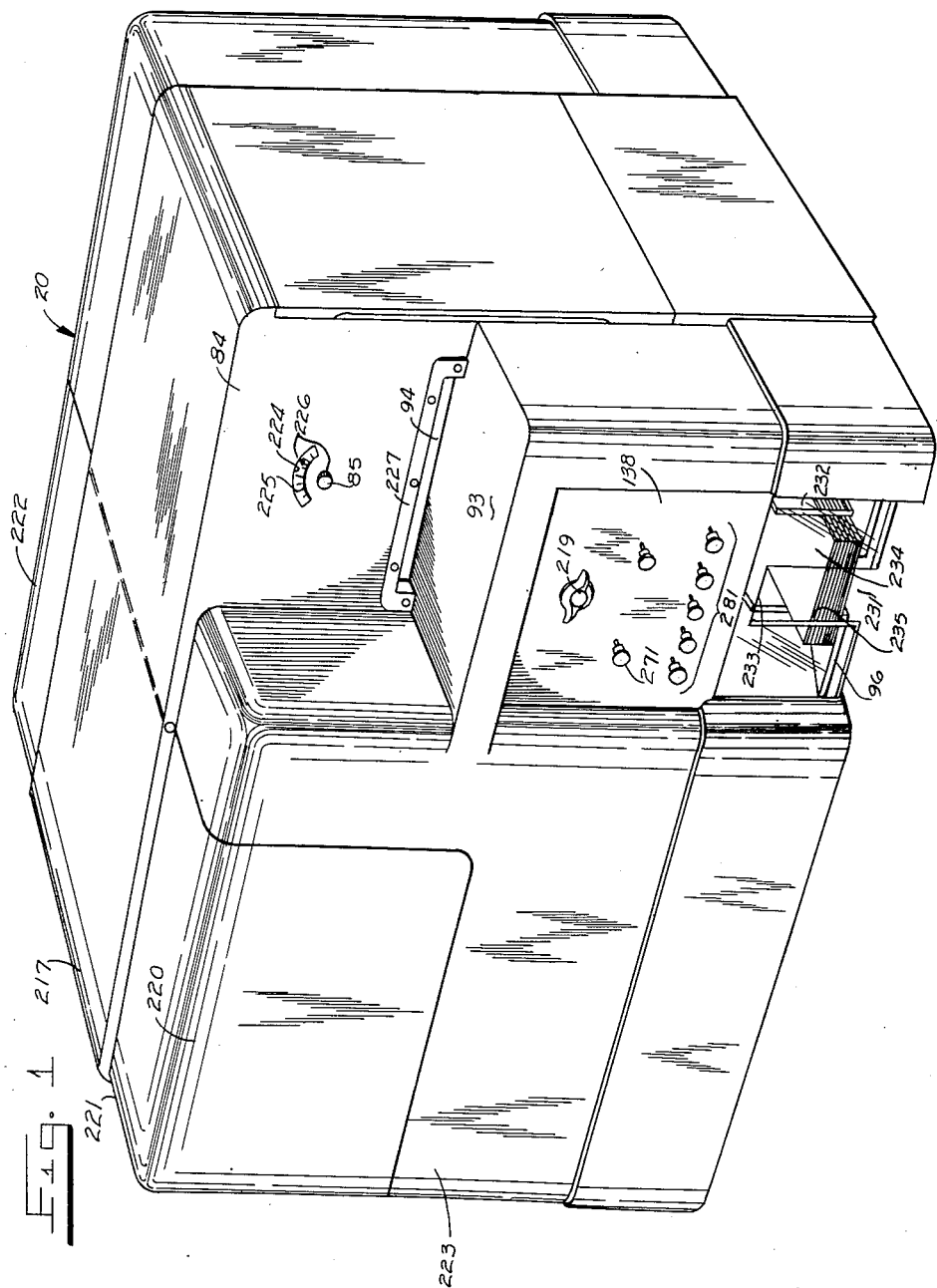
Figure 1 is a perspective view of our new and improved "flow" camera.

The device is housed in a main casing 20 and within the casing are three main compartments. The compartment 21 includes a support plate 22 which is formed integral with a vertical plate 25 and is reinforced by means of a web 26 formed integral therewith. Also formed integral with the plate 25 is a hollow housing 27 which carries a slide 28 which accommodates a lens holder. The camera and its novel features will be presently described.

Figure 2:
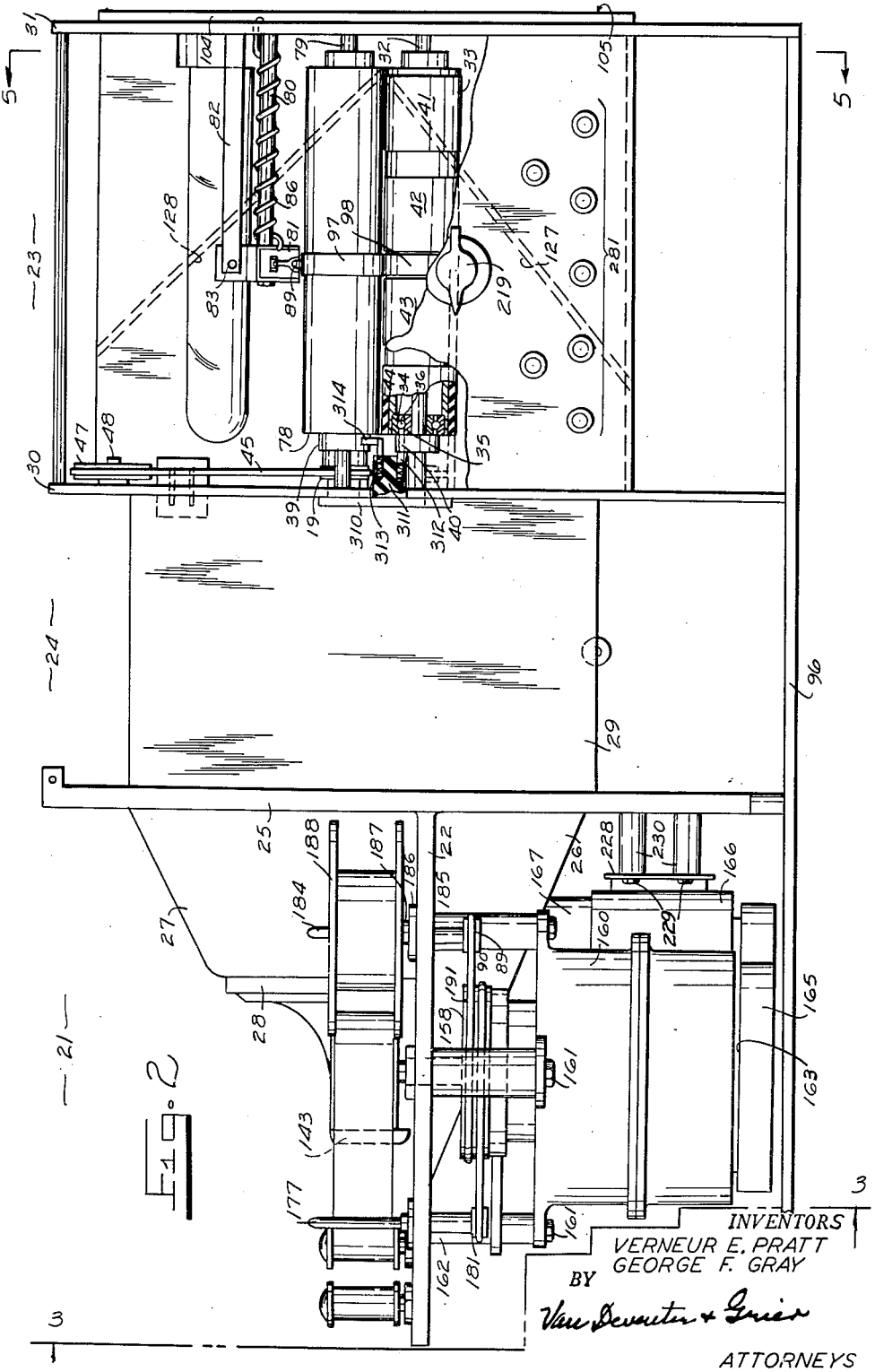
Figure 2 is a front elevation with covers removed and portions broken away to show structural features.

The compartment 24 is adapted to contain relays, transformers, rectifiers and the main electrical connections of the machine. A light tunnel 29 therein communicates with the interior of the compartment 23 and with the interior of the housing 27 for conveying light from the documents to the film in a manner to be presently described. The compartment 23, referring now to Figures 2, 5 and 6, is bounded on one side by a vertical plate 30 which separates it from the compartment 24, and is bounded on the opposite side by a vertical plate 31. Within the compartment 23 and supported in the plates 30 and 31 is a shaft 32 upon which is mounted a roller 33. The roller 33 carries in one end thereof an outer race 34 and an inner race 35 of a ball bearing 36 and is mounted on the shaft 32. The roller 33 carries on its right end, as seen in Figure 2, a similar ball bearing. In a horizontal alignment with the shaft 32 and spaced apart therefrom is a similar shaft 37 which carries a roller 38. The roller 38 may be provided with ball bearings, such as the ball bearing 36 described in connection with the roller 33. Around the rollers 33 and 38 are a plurality of endless belts 41 (which may be seen in Fig. 5) and 42, 43 and 44 (which may be seen in Fig. 6). The shafts 32 and 79 are insulatingly supported in the walls 30 and 31, as will presently be described.

As seen in Figure 5, the pulley 19 on the rear end of the roller 38 is connected by means of a belt 45 to a drive pulley 46. The belt passes upwardly from the roller 38 and over an idler pulley 47 carried on the spindle 48 and thence across the compartment 23 near the top thereof and over an idler pulley 49 carried on a spindle 50. The belt passes downwardly from the pulley 49, thence around the pulley 46 and up to an idler pulley 51 carried on a stud bearing 52. From the pulley 51 the belt passes horizontally to and over a pulley 53 carried on a bearing stud 54 and thence downwardly to the pulley on the rear end of the roller 38. The pulley 46 is carried on a shaft 55 suitably journaled in the compartment 23. The shaft 55 also carries a pulley 56 which is operatively connected by means of a belt 57 to a pulley 58 carried on the shaft 59 of an electric motor 60. The shaft 55 also carries a plurality of pulleys 61 which, in the embodiment herein shown and described, is four. Spaced apart from the pulleys 61 and preferably having their upper surfaces in horizontal alignment with the upper surfaces of the pulleys 61, is a plurality of pulleys 62 which are freely rotatable on shaft 63 supported in the plates 30 and 31. Between the pulleys 62 and the pulleys 61 is a plurality of idler pulleys 64 which are carried on a shaft 65. The shaft 65 is movably supported in the supports 30 and 31 and is spring loaded diagonally upward, as seen in Figure 5.

A belt 66 embraces the end pulleys 61 and 62 as seen in Figure 5, and passes over the idler pulleys 64. Now, since the shaft 65 is spring loaded diagonally upwardly, the spring tension urges the pulleys 64 against the belt 66 for keeping the latter taut. Other individual belts, similar to the belt 66, embrace the other three pulleys 61, the other three pulleys 62, and are kept taut by the other three idler pulleys 64.

In cooperative relationship with the pulleys 62 and the belts 66 thereabout is a plurality of pulleys with belts thereabout. The pulleys 67 are carried on a shaft 69 which is movable vertically in the supports 30 and 31. The shaft 69 is spring loaded downwardly and therefore urges the belt 68 into contact with the belt 66. Going in a counter-clockwise direction, the belt 68 is in contact with the belt 66, passes around the belt 66 passing around the pulley 61 and then extends from the pulley 61 about a pulley 70 carried on a shaft 71. From the pulley 70, the belt 66 is inclined and spans a pulley 72 carried on a support 73. From the pulley 72 the belt 68 extends substantially vertically thence around a pulley 74 and horizontally to the pulley 67. The pulley 74 is carried on a shaft 75 which is movable vertically in the supports 30 and 31 and which is spring loaded upwardly. Thus it will be seen that while the spring load on the shaft 69 above described urges the belt 68 into contact with the belt 66, the spring load on the shaft 75 urges the pulley 74 thereon upwardly and tends to keep the belt 68 taut. A plate 76 having its upper surface substantially in horizontal alignment with the upper surfaces of the belts 41, 42, 43, 44 and with the plurality of belts 66, forms a panel frame for a rectangular glass plate 77 over which the documents pass. The glass plate 77 lies in the field of view of the camera, as will presently be described, so that both the upper and lower surfaces of the documents may be photographed.

A roller 78 is carried on a shaft 79 and the shaft 79 is movably supported in the support plates 30 and 31. The shaft 79 is substantially in vertical alignment with the shaft 32 and the shaft 79 is spring loaded downwardly and is thereby urged into contact with the belts 41, 42, 43 and 44 about the roller 33.

A support rod 80 extends from the supporting wall 31 toward the supporting wall 30 and has pivotally mounted on the end thereof a micro-switch 81. Also extending from the supporting wall 31 substantially parallel to the rod 80 is a bar 82 which carries a threaded hole in alignment with a gear 81a formed on the switch 81 and a screw 83 engages this threaded hole and contacts the gear on the switch. A suitable hole 92 (Fig. 9) is formed in the casing wall 84 and the screw 83 passes through this hole and carries on the outer end a knurled knob 85 by means of which the micro-switch 81 may be adjusted on its supporting rod 80. The micro-switch has an actuating button 87 and in cooperative relation with the button is a spring arm 88 which carries a bumper or buffer 89 adapted to cam against the roller 78. It will be noted that there is a space between the button 87 and the spring arm 88 which may be adjusted by means of the knurled knob 85. By means of this knob the micro-switch may be so set that documents of a predetermined thickness entering between the roller 78 and the belts 41 to 44 about the roller 33 will not cause the roller 78 to raise sufficiently to cause the spring arm 88 to actuate the plunger 87 and the arrangement is so sensitive that the thickness of two such documents entering between the roller 78 and the belts will cause the spring arm 88 to actuate the micro-switch and disable the machine, as will presently be described in connection with Figure 10.

A shaft 90 is in vertical alignment with the shaft 37 and carries a roller 91 which cooperates with the belts 41 to 44, inclusive, passing around the roller 38. A horizontal wall 93 has its upper surface substantially in alignment with the upper surfaces of the belts 41 to 44, inclusive, and it joins the lower end of the wall 84 above referred to. Formed in the lower end of the wall 84 and flush with the upper surface of the wall 93 is an aperture 94 through which documents may be fed between the roller 78 and the belts 41 to 44, inclusive. As the leading edge of a document enters between the aforesaid roller and belts, it is driven thereby in a straight line between the belts and the roller 91, thence across the upper surface of the frame 76 carrying the glass plate 77, and after leaving the frame 76 it passes between the belts 68 and 66 around the pulleys 61 to a point 66a where the belt leaves the document and allows it to remain on the upper surface of the belt 68. A deflecting plate 95 having its end 95a spaced apart from the belt 68 serves to prevent the document from continuing to follow the belt 66 and thereby causes it to remain on the belt 68 to be deposited on the bottom wall 96 of the compartment 23. As the document is traversing the path above described, the document itself causes certain controls to become effective, which results in the photographing of both faces of the document as it passes over the transparent plate 77.

Referring now to Figures 2 and 9, the roller 78 carries a metallic ring 97 the outer diameter of which is preferably not less than the outer diameter of the roller itself. The electrical connections to this metallic ring will be hereinafter described in connection with Figure 10. Although the metallic ring 97 may be placed in various positions along the roller 78, we prefer to have it positioned substantially mid-way between the ends of the roller and for convenience, the switch 81 is positioned so that its bumper 89 bears on the metallic ring 97. It has been pointed out above that the roller 78 is movable vertically relative to the roller 33 and the belts 41 to 44 and by having the bumper 89 engage the metallic ring 97 more positive action of the switch and consequently more accurate adjustment thereof may be effected by having the bumper 89 bear on the metallic ring. It will be borne in mind, however, that the switch 81 is operative even with the bumper 89 engaging the rubber surface of the roller 78.

A second metallic ring 98 is carried by the roller 33 in alignment with the ring 97. Beneath the ring 98, as may be seen in Figure 9, the roller 33 has a portion 99 of reduced diameter thereby forming an annular groove 100. Positioned within the groove and embraced by the metallic ring 98 is a spring 101. The spring 101 is formed of a series of outwardly facing peaks or apexes which engage the inner surface of the ring 98 and between these peaks or apexes are inwardly facing valleys which contact the bottom 99 of the groove 100. The diameter of the ring 98 is slightly larger than the diameter of the roller 33 plus twice the thickness of the belt 41, for example, so that the pressure of the ring 97 against the ring 98 urges the latter downwardly and compresses the spring 101 from above. Thus, when the machine is operating and no documents are fed therethrough the rings 97 and 98 are always in contact with one another. Now, when a document passes between the roller 78 and the belts 41 to 44, inclusive, the ring 98 is physically separated from the ring 97 by the presence of the paper or other material which forms the document.

Applicants are aware that heretofore it has been customary to employ light spring contacts which are actuated by the documents as they pass through the conveyor but such fingers are so delicate that it is impractical to handle other than minute currents with such contacts. Applicants are further aware that attempts have been made in this art to utilize minute currents but even this does not solve the problem. However, it is believed that the arrangement described above is a complete advance in the art as positive rolling contact is effected between the rings 97 and 98. They are of sufficient cross-section and the lines of contact therebetween are such that heavy currents may be handled thereby and control is effected by the presence of the document between the rings instead of having the document perform work on levers, contact arms, etc., as has been customary heretofore. In Figure 9, the document 102 is positioned between and thereby physically separates the metallic rings 97 and 98. A plate 103 in line with and forming an extension of the upper surface of the horizontal wall 93 serves to facilitate the guiding of the document 102 between the roller 78 and the belts 41 to 44, inclusive.

Referring now to Figures 2, 7 and 8, a mirror lamp element, generally designated by the numeral 105, has a base plate 104 upon which is mounted a pair of brackets, one being designated by the numeral 106 and the other by the numeral 107. These brackets are in spaced relation to one another. A socket 108 is mounted on the bracket 106 adjacent to one end thereof and a second socket 109 is mounted on the bracket 106 adjacent to the other end thereof. Mounted in the socket 108 is a lamp 110 and mounted in the socket 109 is a lamp 111. The bracket 107 is provided with a socket 112 adjacent one end thereof and a second socket 113 adjacent the other end thereof. The socket 112 is provided with a lamp 114 and a socket 113 is provided with a lamp 115. Intermediate the brackets 106 and 107 is an open-ended rectangular compartment bounded by walls 116, 117, 118 and 119. A slot is formed in the wall 117 and this slot is bounded by parallel edges 120 and 121 and at the bottom the edge 120 continues angularly as 122 until it cuts the center line of the wall 117. Likewise, the edge 121 continues angularly as an edge 123 until it cuts the center line of the wall at the point 124 mounted on the base plate 104 and within the bottom of the open-ended compartment is a support block 125 having a V-shaped groove 126 formed therein. This block extends from the wall 116 to the wall 118. Mounted on one surface of the V-shaped groove 126 is a mirror 127 and mounted on the other surface of the V-shaped groove is a mirror 128. The wall 119 is slotted identically in the manner described for the wall 117 so that the slot formed between the surfaces 120 and 121 extends through both walls. Mounted on the end of the wall 117 between the edge 120 and the side 116 is a connector plug having a pilot pin 130 and connector blades 131 and 132.

The wall 31 has openings formed therein to accommodate the four lamps and the compartment 105 so that the unit 105 may be compressed into the compartment 23 through such openings in the wall 31 as viewed in Figure 2, until the base plate 104 is flush with the outer surface of the wall 31. When this point has been reached the connector blades 131 and 132 of the connector plug 129 have engaged and entered the slots 133 and 134, respectively, in a socket 135 supported on the wall 30 of the compartment 23. The pilot pin 130 facilitates this operation by first engaging and entering a hole 136 formed in the socket 135 so that the lamps are automatically connected into the lamp circuit by this operation. The open-ended compartment is guided by a transverse U-shaped member 137 mounted in the compartment 23 and this U-shaped member also serves as a support for the deflecting plate 95.

It will be noted from Figure 2 that when the unit 105 is positioned in the compartment 23 as above described, the line where the mirrors meet is in alignment with the path the document follows in passing through the feed mechanism. Therefore, the line of intersection of the mirrors is in alignment with the upper surface of the glass plate 77 and one mirror 128 looks at the upper surface of the document and reflects its image to the left, as seen in Fig. 2, and onto the objective lens and film in a manner to be presently described. The mirror 127 looks at the lower surface of the document through the glass plate 77 and reflects the image of the document to the left and thence to the objective lens and film, as will be described. A front wall 138 joins the walls 93 and 96 to form a closure for the left end of the bottom portion of the compartment 23 as seen in Figure 5. An aperture 139 is formed in the lower portion of the wall 138 through which the documents which are stacked on the bottom wall 96 after leaving the conveyor, may be removed. Mounted on the wall 138 are control elements which will presently be described in connection with the circuit diagram, Figure 10.

Figure 3:
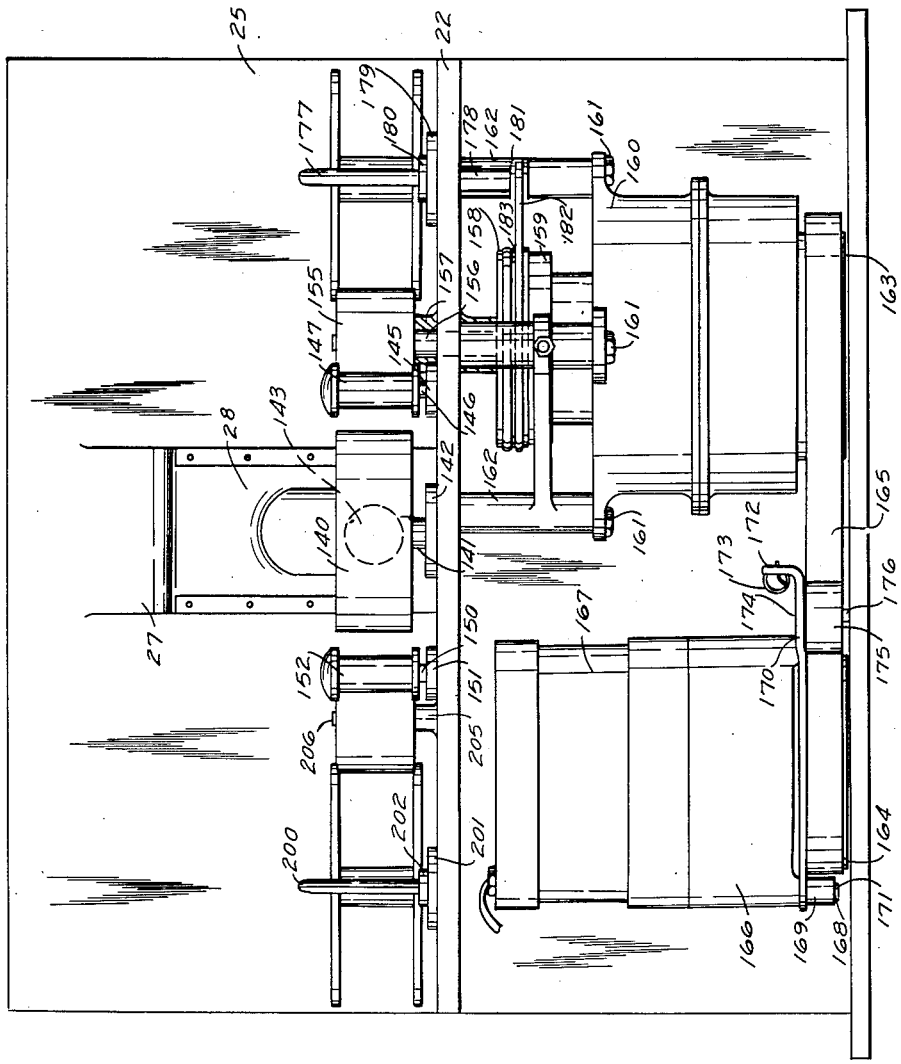
Figure 3 is an elevation taken along the line 3—3 of Figure 2.

Referring to Figures 2, 3 and 4, the camera section of the device includes portions above the plate 22, portions below the plate 22 and elements extending through the plate 22. A free drum 140 is rotatably carried on a vertical boss 141, which has a flange 142 formed integral therewith and secured to the plate 22 in any suitable manner. The center line of the drum 140 preferably intersects the center line of a lens 143 carried in a lens holder 144. The lens holder 144 is supported in the slides 28 on the housing 27. The position of the drum 140 vertically is such that a horizontal center line passing therethrough cuts the center line of the lens.

The plate 22 carries a boss 145 which has a stud 146 extending upwardly therefrom to form a support for a flanged roller 147. In alignment with and spaced apart from the stud 146 is a second stud 148, which may be supported in a boss like the boss 145, and this stud carries a free roller 149.

In alignment laterally with the stud 146 is a third stud 150, which is supported in a boss 151 formed on the plate 22. Rotatably supported on the stud 150 is a flanged roller 152. A fourth stud 153 is spaced apart from the stud 150 and is positioned adjacent to the drum 140. This stud carries a free flanged roller 154. A film driving drum 155 is keyed to a shaft 156 which is journaled in a boss 157 formed on the plate 22 with a portion of the boss extending above the plate and a portion depending therefrom. Keyed to the shaft 156 is a grooved pulley 158 which is also supported on a magnetic clutch 160 adjacent to a flange 159 on the latter. The casing of the magnetic clutch is supported below the plate 22 by means of cap screws or the like 161 extending through spacer bushings 162.

Since magnetic clutches per se are old and are well known in the art, it is not deemed necessary to show details of the one shown in the drawings as it is an item which was purchased on the market from a supplier of magnetic clutches. On the lower end of the housing of the magnetic clutch 160 is a pulley 163 which is connected in driven relation to a drive pulley 164 by means of a belt 165. The drive pulley 164 is carried on a shaft (not shown) in a speed reducer 166 which is mounted on and directly connected to an electric motor 167. The speed reducer 166 carries a stud 168 upon which is pivotally supported a bushing 169 which is secured to an arm 170. The bushing may be prevented from coming off of the stud 168 by means of a cotter pin 171. The lever, fulcrumed on the stud 168, has its right end, as seen in Figure 3, angular with respect to the axis of the arm, such portion being designated by the numeral 172. A spring 173 has one end secured to the portion 172 of the arm 170 and the other end of this spring is connected to the frame so that the arm 170 is urged rearwardly, as seen in Figure 3.

The arm 170 carries a stud 174 upon which a free roller 175 is journaled. The roller may be retained on the stud 174 by means of a cotter pin 176. Due to the urge of the spring 173, the roller 175 engages and maintains the belt 165 taut. When the magnetic clutch 160 is energized (assuming the motor 167 to be running) the pulley 158, the shaft 156 and the film driving drum 155 are rotated.

A shaft or spindle 177 is journaled in a bearing 178 which extends through the plate 22 and is provided with a mounting flange and a boss 180 upon which a take-up reel may be mounted. Secured to the lower end of the spindle 177 is a grooved pulley 181 which is connected in driven relation to the pulley 158 by means of a belt 182 which engages the groove in the pulley 181 and a groove 183 formed in the pulley 158.

In line with and spaced apart rearwardly from the spindle 177 is a second spindle which is journaled in a bearing 185 which extends through the plate 22 and is provided with a mounting flange 186 and a boss 187 upon which a take-up reel, such as the take-up reel 188, may rest. The lower end of the spindle 184 has secured thereto a grooved pulley 189 and this pulley is operatively connected to the pulley by means of a belt 190 which engages the groove in the pulley 189 and a groove 191 formed in the pulley 158. The spindle 177 is used to take up the film stock when the camera is used as a printer, and the spindle 184 is used to take up the negative when the camera is used as a printer, or the negative stock when the camera is used as a camera.

A stud shaft 192 is mounted in a suitable boss in the plate 22 and has pivotally mounted thereon a bracket 193 which in turn carries a vertical stud 194. A free roller 196 is journaled on the stud 194. A second free roller 196 is journaled on the stud 192 and a spring 197 engages the bracket 193 and a pin 198 in the plate 22 for urging the bracket in a counterclockwise direction about the stud 192. Mounted above the roller 195 is a knob 199 adapted to be used for swinging the roller 195 to the left (as viewed in Figure 4) when threading the film and away from its normal position in contact with the film driving drum 155. When the knob 199 is released, the roller 195 is returned to its normal position under the urge of spring 197.

A spindle 200 is positioned on the plate 22 to the left of the roller 152 and this spindle has a flange portion 201 which is secured to the plate and a boss portion upon which a reel placed on the spindle 200 may rest. In alignment rearwardly with the spindle 200, as seen in Figure 4, is a spindle 203 which is also provided with a mounting flange and a boss (not shown) but identical with the flange 201 and the boss 202 just described. A reel of unexposed negative film, such as the reel 204, may be positioned on the spindle 203 when the device is used as a camera or upon which a reel of processed negative film may be positioned when the device is used for printing. A boss 205 on the plate 22 supports a vertical shaft 206 and journaled on the shaft 206 is a free roller or drum 207 which is preferably of the same diameter as the film driving drum 155. Supported in the plate 22 in spaced relation to the vertical shaft 206 is a vertical shaft 208 upon which is pivotally mounted a bracket 209 which carries a vertical shaft 210 upon which a roller 211 is journaled. Positioned on the shaft 210 above the roller 211 is a knob 212. The roller 213 is also journaled on the shaft 208. A spring has one end secured to the bracket 209 and its other end engages a pin 215 mounted in the plate 22. The spring 214 urges the bracket 209 in a clockwise direction so as to bring the roller 211 in contact with the free drum 207.

In Figure 4, an unexposed negative film 216 is shown in the camera. The film 216 from the reel 204 passes around the roller 213 then around the drum 207 and embraces the roller 211. The latter roller, due to the urge of the spring 214, maintains the film in contact with the drum 207. The film passes from the roller 211, around the roller 154 and then passes over the drum 140 between its periphery and the lens 143 and thence around the roller 149. From the roller 149 it passes around the film driving drum 155 to a point where it is contacted by the roller 195. The roller 195, due to the urge of the spring 197, maintains the film in contact with the drum 155. As the film passes from the drum 155, it passes around the roller 195 and over the roller 196 and thence to the take-up reel 188.

The camera portion of the device is enclosed by a light-tight hinged cover, as may be seen in Figure 1. When the film is threaded up, as above described, means is provided for running onto the take-up reel 188 the length of film which has become "light struck." This same means is utilized in cases where the camera cover 217 has to be raised at any time during the operation of the machine, for example, suppose after the machine has been operating, the operator has to stop for any reason and open the camera. This would result in exposing the film to daylight or the light in the room.

A timer 218 is mounted on the wall 138 and an operating knob 219 projects through said wall. When the camera is threaded up, as described above, and the cover 217 is closed, the operator may rotate the knob 219 as far as it will go and then release it. The timer is so set that the length of light struck film between the reels 204 and 188, plus an additional length as a factor of safety, is wound upon the reel 188 so that thereafter when the camera is operated, perfect latent images of the documents are impressed on the film.

If for any reason the camera has to be opened in the midst of operations, the operator causes the timer to operate before the camera is opened so that latent images impressed in the film between the lens 143 and the take-up reel 188 are rolled up on the take-up reel. The operator may then open the camera and after it is again closed, the operator again operates the timer to roll up the film which has become light struck due to the opening of the camera.

The camera cover 217 has downwardly depending portions 220, 221 and 222 which cooperate with vertical walls, such as the vertical wall 223, to form a light-tight compartment. Above the knob 85 which extends through the wall 84 is formed an arcuate window 224 behind which is positioned a scale 225 and a pointer 226 secured to the screw 83 traverses the scale 225 and forms a visual indicator which the operator may use as a guide when setting the micro-switch 81 to accommodate different thicknesses of documents. The document aperture may be bounded by suitable trim 227. The motor 167 and speed reducer 166 are mounted on a bracket 228 which is supported on the vertical wall 25 by means of cap screws 229 extending through spacer sleeves 230, as shown in Figure 2.

Referring to Figure 1, the bottom wall 96 may have a slot 231 formed therein adjacent to the opening 139 and mounted on the bottom wall 96 are vertical guide members 232 and 233 for guiding the documents. Abutting the end of the bottom wall 96 is a panel 234 which may have a rectangular opening 235 formed therein. The documents delivered by the belt 68 are deposited between the guide members 232 and 233 and may come to rest in contact with the panel 234. When the operator desires to remove fed documents from the machine, the panel 234 may be swung upwardly and the documents are easily grasped by the hand, due to the presence of the slot 231 in the bottom wall 96.

Referring now to Figure 10, which is a circuit diagram of the machine, a connector plug 236 carries the usual prongs and is provided with a safety ground connection 237. The plug 236 is connected via a cable 238 to a socket 239. A connector plug 240 is adapted to cooperate with the socket 239 and leads current via wires 241 and 242 to a switch 243. From the switch 243, a conductor 244 is connected to one end of an auto-transformer winding 245, and a branch conductor 246 leads from the conductor 244 to one terminal 247 of the conveyor motor 60, to a bus line 248, and to one terminal 249 of the lights 110, 111, 114 and 115. The bust 248 connects to a terminal 251 on the terminal strip 250. The conductor 244 is broken and connected in series therewith via wires 86 are the contact arms of a micro-switch 81. This micro-switch is normally closed and is opened when more than one document enters between the rollers 33 and 78 of the document feeder. When more than one document enters between the rollers, the spring arm 88 depresses the plunger 87 and opens the contacts in the micro-switch, thereby cutting current off from all elements of the device. From the switch 243, a second conductor 252, constituting the other side of the line, leads to a contact on the terminal strip 250. A branch conductor 254 leads from the conductor 252 to one terminal of the primary winding of a one-to-one transformer 255. The other terminal of this primary is connected via a wire 256 to the terminal 251. A second branch connection 257 leads from the conductor 252 to the other terminal of the conveyor motor 60, and a branch connection 258 connects the terminal 253 to a terminal 259 on the terminal strip 250. The secondary of the transformer 255 has one end grounded at 260 and the other end is connected via a wire 261 to a terminal 262, and a branch wire 263 is connected to one end of a relay winding 264. The other end of this winding is connected via a wire 265 to a terminal 266 on the terminal strip 250 and a branch wire 267 connected thereto leads to contact ring 97. The contact ring 98 cooperating therewith is connected via wire 268 to ground.

The relay winding 264 is energized when the switch 243 is closed, due to the fact that one side receives current from the secondary of the transformer 255 via the wires 261 and 263 and the other side of the relay winding is connected via the wires 265 and 267 and thence via the contact rings 97 and 98 to ground, and thence through the ground to the other end 260 of the secondary winding of the transformer. Now, when documents pass between the contact rings 97 and 98 and separate them, the contact points 295 and 297 of the relay 264 close, thereby supplying current to the quarter point of the rectifier via the wire 299. This causes the rectifier to function and current is supplied therefrom to the magnetic clutch, as follows: from the end connections of the rectifier via the wires 302 and 284. The other side of the circuit extends from the magnetic clutch via the wire 282, via the wire 304 to the midpoint of the rectifier 300.

The timer 218 is connected in bridging relation to the contact points 295 and 297 and when set to operate will energize the magnetic clutch without the necessity of the relay 264 operating.

A power switch 271 has a plurality of contact points 272 connected to several taps on the auto-transformer winding 245. A movable contact arm 273 in the switch 271 is adapted to traverse the contact points whereby the operator may selectively vary the voltage output in accordance with the requirements. The switch arm 273 is connected via a wire 274 to a terminal 275 on the terminal strip 250, and a branch connection 276 is connected to a terminal 277 on the strip 250.

The other terminal of the lights is connected by a wire 279 to the common terminal of an intensity switch 281 which consists of a plurality of switches having the common terminal 280 and other terminals which connect to several taps on the auto-transformer winding 245, so that the lights may be selectively illuminated at any one of several different intensities. The magnetic clutch 160 has one terminal connected via a wire 282 to the terminal 283 on the strip 250 and its other terminal is connected via a wire 284 to terminal 285. The camera motor 167 has one terminal connected via a wire 286 to the terminal 287 and its other terminal is connected via a wire 288 to the terminal 289 on the terminal strip 250.

A buzzer 290 has one terminal connected via a wire 291 to a terminal 292 and its other terminal is connected via a wire 293 to a terminal 294 on the terminal strip 250.

The relay 264 has one terminal 295 connected to one side of the line which may be traced as follows: through a wire 296 to the terminal 259 thence via the branch connection 258 to the terminal 253 and thence via the wire 252 to one side of the switch 243. The other terminal 297 of the relay is connected via a wire 298 to the terminal 277 and as hereinbefore described the terminal 277 is connected through a branch wire 276 to the terminal 275 and thence via a wire 274 to the moving arm 273 of the power switch 271. A branch wire 299 connected to the wire 298 is in turn connected to a quarter point of a copper oxide rectifier 300. The outer ends of the rectifier are connected together by means of a wire 301 and this connection is led by a wire 302 to the terminal 285 which is in turn connected by a wire 284 to one terminal of the magnetic clutch 160. The mid-point 303 of the rectifier 300 is connected via a wire 304 to the terminal 283 which is in turn connected via the wire 282 to the magnetic clutch. The three-quarter point on the rectifier is connected via a wire 305 to the terminal 294, which in turn is connected by means of a wire 306 to the terminal 251 and the circuit may be traced to the opposite side of the line as follows: via a branch wire 248 to the wire 246 and the wire 244 to the other side of the switch 243. Thus, the rectifier receives current from the source of power, and when the contact points 295 and 297 are closed, the magnetic clutch 160 is energized with direct current at a lower voltage.

A switch 307 which is positioned within the camera and contacts the film is provided to give an indication to the operator when the film has just about exhausted. This switch closes when the supply of film has reached a predetermined low and causes the buzzer 290 to operate. The switch 307 is connected via a branch wire 308 to the camera motor wire 286. The other side of the buzzer is connected via a wire 309 to the terminal 292.

The timer 218 has one terminal thereof connected via a wire 269 to the wire 296 and the other terminal of the timer is connected via a wire 270 to the wire 298 so that when the timer is actuated, its contact points, which bridge the contact points 295 and 297 of the relay, as aforesaid, are closed thereby energizing the magnetic clutch 160.

The shaft 32 is insulatedly supported in the vertical walls 30 and 31. An insulating block 310 secured to the wall 24 supports one end of the shaft 32 and one end of the shaft 79. The shaft 79 is movable vertically away from the shaft 32 and spring means (not shown) urges the shaft 79 downwardly on each end thereof so that the contact ring 97 is normally in contact with the contact ring 98. Since the shafts 32 and 79 are insulatedly supported, electrical connections are made to the contact rings 97 and 98 as follows: the contact ring 97 is connected to a slip ring 39, and the contact ring 98 is connected to the slip ring 40. An insulated block 311 formed integral with the block 310 carries a spring-loaded contact brush 312 which contacts the slip ring 40. A stud 313 mounted in the block 311 carries a resilient contact finger 314 which contacts the slip ring 39. The contact finger 314 may be formed of spring brass or Phosphor bronze and is sufficiently long and resilient to maintain contact with the slip ring 39 even though the shaft 79 be displaced upwardly.

The space 24 between the camera compartment and the document feeder compartment is spanned by the light tunnel 29 which delivers light from the mirrors 127 and 128 to the camera lens and the remainder of the space 24 is utilized to house the auto-transformer 245, the connection strips, the relay, the conveyor motor, the rectifier, the transformer 255, the buzzer 290 and the power switch 271. This arrangement makes the camera very convenient for servicing, as all of the above mentioned instrumentalities may be serviced without the necessity of having to disturb the camera apparatus in the compartment 21 or the conveyor apparatus in the compartment 23.

In the modification shown in Figure 11, the bar 82, in addition to supporting the screw 83 carrying a knurled knob 85 for adjusting the position of the microswitch 81 with respect to the roller 78, also supports a screw 315 which carries a knurled knob 316. The screw extends through a hole 317 in the panel 84, and the support rod 80, in addition to supporting the microswitch 81, supports a second microswitch 318. The metallic ring 97 carried by the roller 78 is lengthened and is designated in Figure 11 as 97a. The microswitch 81 is both in the original arrangement and in the modification, a normally closed switch and by means of the knurled knob 85 and the screw 83, may be adjusted to remain closed as long as documents of a predetermined thickness (in accordance with the setting of the knob 85) pass between the rollers 33 and 78, and if two or more documents are stuck together and enter between the rollers, the roller 78 is displaced upwardly sufficiently to cause the contacts in the microswitch 81 to open.

The microswitch 318 is identical with the microswitch 81, in other words, it includes contacts which are normally closed and by means of the knob 316 and the screw 315, this switch may be adjusted so that any document entering between the rollers 33 and 78 will cause the contacts to open. In this arrangement, the metallic ring 98 which is floatingly carried by the roller 33 may be eliminated, because the microswitch 318 would function as and take the place of the cooperating rings. The ring 97, however, would preferably be retained and made sufficiently wide for the bumpers 89 on both switches to ride on and the function of this ring is to provide a true running metallic surface for the bumpers of the switches to ride on and thereby enable accurate adjustment of the switches to be made by means of the knobs 85 and 316.

Since a circuit diagram showing the modification would be repetitive except for the elimination of the combination of metallic rings 97 and 98 for controlling the advancing of the film in the camera, it is believed sufficient to describe that the switch 318 would be substituted for the rings 97 and 98 in Figure 10, and that the conductor 267 in Figure 10 would connect to one contact in the switch and the wire 268 leading to the ground would be connected to the other contact in the switch 318.

Although the arrangement in Figure 9 shows the metallic ring 97 fixed on the roller 78 and metallic ring 98 is shown as floatingly carried in a groove 100 in the roller 33, it will be understood that the device will operate in exactly the same manner if the metallic ring 98 were floatingly carried on the roller 78 and the metallic ring 97 fixedly carried on the roller 33. Of course, the ring 98 in such an instance would be smaller in diameter than is shown in Figure 9 and the ring 97 when fixedly carried on the roller 33 would be slightly larger in diameter than the diameter of the roller 33 plus double the thickness of the belts. If the order of the rings were reversed, as suggested above, a separate fixed ring would be carried on the roller 78 to control the microswitch 81 in instances where the function of the switch 81 is to be included in the device.

Referring to Figure 6, details of the interior of the light tunnel 29 are shown. The wall 30 has a rectangular opening or slit 319 through which light from the mirrors 127 and 128 is reflected. In alignment with the slit 319 is a second rectangular opening or slit 320 formed in the wall 29a of the light tunnel 29. Parallel to the wall 29a, the light tunnel has a wall 29b, and formed in the wall 29b and in alignment with the openings 319 and 320 is an opening 321 which is in alignment with an opening 322 formed in the spacer member 323 and an opening 324 formed in the wall 25, so that light may pass from the interior of the light tunnel 29 to the interior of the hollow housing 27, and thence to the lens 143. Within the right end of the light tunnel 29, as shown in Figure 6, is mounted a surface mirror 325 which is adapted to reflect light passing through the openings 319 and 320 toward the left end of the light tunnel 29. Also mounted in the right end of the light tunnel 29 is a second surface mirror 326 adapted to reflect light from the left end of the light tunnel 29 through the openings 321, 322 and 324 into the housing 27. The mirrors 325 and 326 are fixed.

Spaced apart from the mirrors 325 and 326 is a movable frame 327 which has parallel sides 328 and 329, which contact and form a working fit with the sides 29a and 29b. Positioned in the frame 327 is a surface mirror 330 which is adapted to receive light from the mirror 325 and reflect it toward a second surface mirror 331 also mounted in the frame 327. The angularity of the mirrors 330 and 331 is such that light reflected to the mirror 330 from the mirror 325 is reflected to the mirror 331 and thence is reflected to the surface of the mirror 326 and thence through the holes 321, 322 and 324. The movable frame 327 has a member "B" secured thereto and this member has an internally threaded hole formed therein. Engaging the threaded hole are threads 332 formed on a rod 333. The rod 333 is provided with a knob 334 by means of which it may be rotated and members "A" at each end of the light tunnel 29 are slotted to engage grooves formed in the rod 33 so that these grooves prevent any end-play of the rod 333. Thus, when the rod is turned by means of the knob 334 the frame 327 may be moved to the right or to the left in order to bring images of documents passing over the glass plate 77 in focus on the film in the camera without moving the lens or the glass plate 77. Another feature which is gained in the use of the light tunnel 29 is that the light passing through the light tunnel traverses a substantially long path and the length of this path taken away from the throw of the lens enables us to make the machine substantially narrow with the advantage that it may be used in places where space is at a premium, etc.

Referring now to Figures 12, 14 and 15, a modification is shown wherein the document feed or conveyor rollers 33 and 78 are modified and are designated respectively by the numerals 33a and 78a. The shaft 32a has an annular groove 335 formed on one end thereof and an annular groove 336 formed on the other end thereof. Likewise, the shaft 79a has an annular groove 337 formed on one end thereof and a second annular groove 338 formed on the other end thereof. Likewise, the shaft 37a, corresponding to the shaft 37, has annular grooves formed on each end thereof, one of which is shown at 339 and the shaft 90a has grooves, one at each end thereof, one being designated by the numeral 340, in Figure 14.

A bracket member 341 has a horizontal portion 342 carrying serrations or teeth 343. Formed integral with the horizontal portion is a vertical leg 344, the upper end 345 of which is curved to fit the groove 340 formed in the end of the shaft 90a. The other end of the horizontal portion 342 has a vertical leg 346, the upper end 347 of which is curved to fit the groove 337, in the shaft 79a. A second bracket 348 is identical with the bracket 341 and has a horizontal portion 349 carrying teeth or serrations 350 and vertical portions 351 and 352 formed integral therewith, the respective ends 353 and 354 of which are curved to fit the grooves 339 in the shaft 37a and 335 in the shaft 32a. The wall or plate 31a has a vertical elongated hole 355 formed therein through which the end of the shaft 79a extends, and a second vertically elongated hole 356 spaced apart therefrom and through which the end of shaft 90a extends. The holes in the wall 31a through which the shafts 32a and 37a extend, are not elongated. A spring 357 has its upper end in the form of a hook 358 and its lower end in the form of a hook 359. The hook 358 engages the serrations 343 and the hook 359 engages the serrations 350 and thereby the spring 357 urges the shafts 79a and 90a downwardly and consequently, the rollers carried by these shafts are urged downwardly into engagement with the rollers carried by the shafts 32a and 37a, respectively. When the hooks of the spring 357 engage the central serrations in the members 341 and 348, the spring urge on the shafts 79a and 90a is theoretically substantially equal. By moving the spring, or at least the upper end thereof to the left and thereby causing the hook 358 to engage serrations to the left of the center, as seen in Fig. 14, a greater urge is impressed upon the roller carried by the shaft 79a than is impressed by the roller carried on the shaft 90a. Likewise, movement of the hook 358 to the right would exert less urge upon the roller carried by the shaft 79a and a greater urge on the roller carried by the shaft 90a. The hook 359 may be moved to engage serrations to the right or to the left of the center, thereby giving a greater number of possible adjustments of the tension or urge upon either of the rollers carried by the shafts 79a and 90a, as desired.

In the modification shown in Figures 12 and 13, the shaft 32a carries a ball bearing 360 near one end thereof and a ball bearing 361 spaced apart therefrom. An end member 362 is bored out to accommodate the outer race of the ball bearing 360 and has a portion 363 of reduced diameter with a hole therethrough clearing the shaft 32a. A member 364 is bored out to accommodate the outer race of the ball bearing 361 and this member has a portion 365 of reduced diameter and a clearance hole therethrough clearing the shaft 32a. Forced over the portions 363 and 365 is a tube 366 and this tube has mounted thereon or bonded thereto a roller 367 which may have a continuous annular portion 368 in contact with the tube 366 and a plurality of spaced annular portions 369 which are all of substantially equal diameter.

The shaft 79a carries a ball bearing 370 near one end thereof and a ball bearing 371 near the other end thereof. An end member 372 is bored out to accommodate the outer race of the ball bearing 370 and has a portion 373 of reduced diameter with a hole therethrough clearing the shaft 79a. A member 374 is bored out to accommodate the outer race of the ball bearing 371 and this member has a portion 375 of reduced diameter and a clearance hole therethrough clearing the shaft 79a. Forced over the portions 373 and 375 is a tube 376 which has mounted thereon or bonded thereto a roller 377, which may have a continuous annular portion 378 in contact with the tube 376 and a plurality of spaced annular portions 379 which are all of substantially equal diameter and which match and contact the spaced annular portions 369 of the roller 367. These spaced annular portions, hereinafter termed "annulose" portions, are all slightly larger in diameter than the diameters of the end members 361, 371; 362, 370; so that when the latter contact each other, the annulose portions contact each other under tension. Mounted in substantially the same manner on the shafts 37a and 90a are like rollers 380 and 381. The annulose portions on the roller 380 are in alignment with the annulose portions 369 on the roller 367 and therefore the spaces between said annulose portions on both rollers are in alignment with each other.

Positioned within the spaces between the annulose portions and spanning the rollers 367 and 380 within these spaces is a plurality of belts 382. Secured to the roller 380 is a pulley 383. This pulley may be secured to or formed integral with the portion of the roller 380 (not shown) corresponding to the portion 364 of the roller 367, and a belt 45a, corresponding to the belt 45, shown in Fig. 5, drives the pulley 383 and consequently rotates the roller 380. The roller 367 is in turn rotated by the plurality of belts 382. The rollers 380 and 367 rotate in a counter-clockwise direction, as seen in Fig. 16, and the rollers 381 and 377 cooperating therewith, respectively, rotate in a clockwise direction. Thus, when document 384 is fed via the feeding throat 418 between the rollers 367 and 377, it is moved to the left, as seen in Fig. 16, passes between the rollers 380 and 381, and thence the document passes over the glass plate 76 and thereby passes through the field of view of the camera and is delivered between the belts 66 and 68, as seen in Fig. 5.

The continuous annular portions and the spaced annular portions of the rollers 367, 377, 380 and 381, are each preferably formed of rubber or the like, and are preferably quite resilient, so that as a document 384 passes between cooperating pairs of these rollers, the faces of the annular portions are deformed, as shown exaggerated in Fig. 13. Thereby the documents are engaged by a gentle resilient but firm grip and this grip may be varied within certain limits by means of the spring means 357, shown in Figs. 14 and 15.

Applicants have hereinabove described switching means which disables all circuits in the machine when more than one document (for example two or more documents stuck together) is fed between the rollers. In the arrangement shown in Fig. 16, when plural documents enter between the rollers 367 and 377, switching means, to be presently described (but similar to the one previously described) disables all circuits in the machine, and this occurs long before the document enters the field of view of the camera. As soon as the circuits in the machine are disabled, the machine stops, and due to the fact that the rollers 367 and 377 are formed of resilient rubber or the like, the documents may be easily pulled from between these rollers without having to dismantle the machine. As soon as the documents are pulled from between the rollers, as described, the cause of the disablement having been removed, the machine starts up again due to the fact that the rollers 367 and 377 are no longer separated by the documents, and therefore the switching means closes and reestablishes all of the circuits in the machine, and thereafter the documents may be fed one at a time, as before.

In connection with Figures 9 and 11, applicants have described the use of a microswitch for disabling all circuits in the machine when plural documents enter between the feed rollers.

In the arrangement shown in Figures 16 and 17, a modification of the arrangement previously described is shown, wherein the linkages between the top feed roller and the microswitch are multiplied, thereby giving a finer degree of control of the microswitches. In the arrangement shown in Figs. 16 and 17, two microswitches are employed, one for controlling the lights and the camera clutch and the other for disabling all circuits in the machine. The former, 385, corresponds to the switch 318 previously described in connection with Fig. 11, and the latter, 386, corresponds to the microswitch 81. Mounted in the wall 84a is a fixed bracket 387 having spaced legs 388 and 389. Mounted in aligned holes in the legs 388 and 389 is a fixed shaft 390. A bracket 391 includes side portions 392 and 393 joined by a web 394. The side portions 392 and 393 have aligned holes 395 formed therein which form bearings on the shaft 390. Spaced apart from the aligned holes 395 in the side portions 392 and 393 are aligned holes 396 into which are pressed a shaft 397. Fixed on the shaft 397 intermediate the side portions 392 and 393 is a ball bearing 398 which rolls on the surface of the second annulose from the right end of the roller 377 (as seen in Fig. 12). This annulose is formed of metal and is designated by the numeral 420.

A channel 399 has side portions 400 and 401 which are spaced apart to accommodate the microswitch 385. The sides 400 and 401 are provided with extensions 402 and 403, respectively, which have aligned holes formed therein which form a working fit on the shaft 390. A second channel 404 has sides 405 and 406 spaced apart to accommodate the microswitch 386, and these sides have integral therewith, respectively, extensions 407 and 408, through which aligned holes are formed to form a working fit on the shaft 390. A spacing collar 409 is positioned on the shaft 390 between the side 401 of the channel 399 and the side 405 of the channel 404. The microswitch 385 has an actuating plunger 410 which is adapted to be engaged by the web 394 of the bracket 391, and a helical spring 411, surrounding the actuating plunger, bears against the microswitch 385 and against the web 394 and thereby urges the outer race of the ball bearing 398 into rolling contact with the end portion 372 of the roller 377. A screw 412 threadedly engages a threaded hole in the bracket 387 and has a nose portion 413 which bears against the channel member 399. The screw has fixed thereto or integral therewith, a knob 414 which is adjustable from outside the machine for bearing against the channel 399 and by means of which the opening of the microswitch 385 may be adjusted. A similar screw-knob arrangement has a knob 416 and a nose portion 415 which bears against the channel 404 for adjusting the microswitch 386. The microswitch 386 carries an actuating plunger 417, like the plunger 410, and it is surrounded by a helical spring like the spring 411. With the switch 385 connected in the circuit, Fig. 10, in place of the metallic rings 97, 98 and with the switch 386 connected in the circuit, in place of the switch 81, the thumb screw 414 may be adjusted so that the switch opens when a single document is fed between the rollers 367 and 377, and the knob 416 may be adjusted so that the switch 386 will open when the rollers 367 and 377 are separated a distance greater than the thickness of a single document. By this arrangement, as long as single documents are fed between the rollers 367 and 377, the lights and the camera motor are energized, and the camera functions normally.

Now, when two or more documents, stuck together, are fed between these rollers, the deflection of the roller 377 upwardly is sufficient to open the switch 386 and thereby disable all of the circuits in the machine. This causes the machine to stop, and due to the fact that the document is between the first pair of rollers and has not yet reached the field of view of the camera, no exposure of the film has occurred, and all the operator has to do is to pull the documents out from between the rollers and the machine automatically restores itself and will continue to accept and photograph documents no thicker than the machine was set up to accommodate. As pointed out above, pulling the documents out from between the rollers is easy, particularly where rollers such as those shown and described in Figs. 12 and 13, are employed. The belts 382 between the rollers 367 and 380, guide the leading edge of the document between the rollers 380 and 381, in case the edge of the document is deflected downwardly. Likewise, if desired, belts like the belts 382 may be employed in connection with the rollers 377 and 381, in which case deflection of the leading edge of the document upwardly or downwardly would be overcome and the document would be guided between the rollers 380 and 381.

In the following claims, the term "annulose roller" is intended to define a roller such as is illustrated in Figs. 12 and 13, including a resilient coating which has a continuous annular portion (for example, the portion 368) and a plurality of spaced annular portions integral therewith (such as the portions 369) which are all of substantially equal diameter. In other words, the annulose roller is considered as having a plurality of spaced annular portions with annular furrows or grooves therebetween.

Although we have herein shown and described by way of example one embodiment of our new and improved camera and a modification thereof, it is obvious that many changes may be made in the arrangements herein shown and described without departing from the spirit of the invention as defined in the following claims.

What is claimed is:

1. In a flow camera device, a camera having a field of view, a document conveyor for moving documents across said field of view, said conveyor including cooperating rollers one of which is urged toward the other, said one roller being adapted to be raised by documents passing between it and the roller with which it cooperates, a first and a second normally closed switching means, both being adapted to be actuated by said last mentioned roller, said first switching means being adapted to be opened by a single document passing between said roller and its cooperating roller, thereby causing said camera to advance film, and said second switching means being adapted to be opened by more than one document passing between said roller and its cooperating roller, said switches being connected in series and connected to circuits in said device whereby a single document entering between the rollers causes said first switching means to close without opening said second switching means and whereby more than one document entering between said rollers causes said second switching means to open before said documents reach said field of view and prevent said circuits from being completed.

2. In a flow camera device, a camera having a field of view, a document conveyor for moving documents across said field of view, said conveyor including a pair of cooperative rollers, at least one of which is adapted to be displaced upwardly by documents fed therebetween, switching means remote from said documents and actuated by said last mentioned roller for controlling the movement of said camera to photograph a document passing across said field of view, and a second switching means spaced apart from said rollers and remote from the documents and out of contact therewith and actuated by said last mentioned roller for disabling said document conveyor when more than one document enters between said rollers, thereby preventing a plurality of documents from entering said field of view at one time and preventing the photographing of said document as aforesaid.

3. In a flow camera device, a camera having a field of view, a document conveyor for moving documents across said field of view, means for illuminating said field of view, a motor for driving said camera, a magnetic clutch between said motor and said camera, means for driving said conveyor, said conveyor including a pair of cooperative rollers at least one of which is adapted to be displaced by documents fed therebetween, switching means in contact with said last mentioned roller, a circuit including said switching means, said magnetic clutch and a source of current for causing said camera to advance film in timed relation with the movement of documents through said conveyor and to photograph a document carried across said field of view by said conveyor, a second switching means spaced apart from said rollers and operated by said last mentioned roller and out of contact therewith and included between said source and all circuits in said device for disabling them when said last mentioned roller is displaced a distance greater than the thickness of a single document.

4. In a flow camera device, a camera having a field of view and including film supporting and advancing means, a magnetic clutch connected to said advancing means, an electric motor for driving said clutch, a document conveyor for moving documents across said field of view, said conveyor including at least one pair of cooperative rollers one of which is adapted to be displaced by documents fed therebetween, means for illuminating said field of view, motor means for driving said document conveyor, annular contact rings carried by said rollers, said rings being normally in contact with one another and the contact between them being adapted to be broken by documents fed therebetween, circuits connected to said rings for actuating said magnetic clutch, illuminating said field of view, and causing said camera to advance film therein when said rings are separated by documents passing therebetween, and switching means spaced apart from said rollers and remote from said documents and out of contact therewith and actuated by said last mentioned roller for disconnecting all circuits in said device from a source of current when said last roller is deflected a distance greater than the thickness of a single document.

5. In a flow camera device, a camera having a field of view, a document conveyor for moving documents across said field of view, said conveyor including a pair of cooperative rollers at least one of which is adapted to be displaced upwardly from the path of the documents by documents passing therebetween, said last mentioned roller including an annular non-resilient band, a bracket supported in said device, a micro-switch pivotally supported on said bracket, said micro-switch including an operating plunger, a yoke also pivotally supported on said bracket and including a roller adapted to cooperate with said annular band, said yoke having a portion adjacent to said plunger, and means on said bracket and engaging said switch for adjusting the latter to cause it to open when said last mentioned roller is displaced upwardly a predetermined distance.

VERNEUR E. PRATT.
GEORGE F. GRAY.

REFERENCES CITED

The following references are of record in the file of this patent:

UNITED STATES PATENTS

| Number | Name | Date |
|---|---|---|
| 567,262 | Child | Sept. 8, 1896 |
| 567,303 | Dexter | Sept. 8, 1896 |
| 1,068,573 | Dear et al. | July 29, 1913 |
| 2,120,369 | Mills | June 14, 1938 |
| 2,150,543 | Ybarrondo | Mar. 14, 1939 |
| 2,292,825 | Dilks | Aug. 11, 1942 |
| 2,337,064 | Peters | Dec. 21, 1943 |
| 2,411,694 | Place | Nov. 26, 1946 |
| 2,419,836 | Holbrook | Apr. 29, 1947 |

FOREIGN PATENTS

| Number | Country | Date |
|---|---|---|
| 406,641 | Germany | Dec. 2, 1924 |